United States Patent
Andersson et al.

[11] Patent Number: 6,079,476
[45] Date of Patent: Jun. 27, 2000

[54] METHOD FOR PRODUCING PRE-TREATED MOLTEN METAL CASTINGS

[75] Inventors: Conny Andersson, Eskilstuna, Sweden; Mike J Walker, Airdrie, Canada

[73] Assignee: Sintercast AB, Stockholm, Sweden

[21] Appl. No.: 09/068,775

[22] PCT Filed: Nov. 11, 1996

[86] PCT No.: PCT/SE96/01446

§ 371 Date: May 15, 1998

§ 102(e) Date: May 15, 1998

[87] PCT Pub. No.: WO97/18337

PCT Pub. Date: May 22, 1997

[30] Foreign Application Priority Data

Nov. 16, 1995 [SE] Sweden ................... 9504096

[51] Int. Cl.[7] ............ B22D 27/00; B22D 46/00
[52] U.S. Cl. ............ 164/58.1; 164/4.1; 164/61
[58] Field of Search ............. 164/58.1, 57.1, 164/61, 65, 4.1

[56] References Cited

U.S. PATENT DOCUMENTS 3,764,305  10/1973  Andersson .............. 75/10.17
4,390,362   6/1983  Khusnutdinov et al. ...... 75/49
5,161,604  11/1992  Chandley et al. .......... 164/57.1
5,758,706   6/1998  Bäckerud et al. .......... 164/57.1

FOREIGN PATENT DOCUMENTS 313323  8/1969  Sweden .
328673  9/1970  Sweden .
95/18869  7/1995  WIPO .

*Primary Examiner*—Harold Pyon
*Assistant Examiner*—I.-H. Lin
*Attorney, Agent, or Firm*—Pillsbury Madison & Sutro LLP

[57] ABSTRACT

A method for producing metal castings comprising the steps of: i) providing a conditioning furnace, having an inlet channel and an outlet channel, with pre-treated molten metal; and ii) reducing the height of molten metal in the outlet channel to a level ($h_1$) lower than the level of the molten metal in the conditioning furnace ($h_0$) such that the molten metal in the spout and in the outlet channel, at least partly, is brought back into the furnace body where it can be recharged with a nucleating and/or structure modifying agent, iii) adding further nucleating and/or structure agent to the molten metal when necessary, iv) mixing the melt in the furnace when necessary and v) after the stoppage, casting the melt with the desired content of structure modifying agent.

11 Claims, 2 Drawing Sheets

METHOD FOR PRODUCING PRE-TREATED MOLTEN METAL CASTINGS

This application is the national phase of international application PCT/SE96/01446, filed Nov. 11, 1996 which designated the U.S.

BACKGROUND OF THE INVENTION

The present invention relates to a method of producing pre-treated molten metal for casting objects.

The Swedish patent application 9304347-9 discloses a method of continuous and/or semi-continous casting of compacted graphite iron (CGI) wherein a structure modifying agent is added to the molten iron before it is supplied to a closed conditioning furnace provided with inlet and outlet channels, e.g a pressurized pouring furnace. In operation, the quantity of molten cast iron is maintained within predetermined limits by replacing, intermittently, the cast iron tapped from the conditioning furnace with a compensation amount of molten cast iron taken from a reaction vessel. Magnesium as structure modifying agent is added to the molten cast iron in the reaction vessel and, optionally, in the conditioning vessel. FIG. 1 discloses a preferred embodiment of this prior art.

The overpressure in the furnace space (16) can be regulated for controlling the melt flow through the tapping hole (13) placed in the spout (9). In case of longer stoppages the overpressure is removed so that the melt (5) in the spout (9) will be drawn back into the furnace (16) such that the melt level will be the same in the inlet and outlet channels as within the furnace chamber as indicated with broken lines in FIG. 1. Therewith, the fading rate of magnesium is reduced. The magnesium loss from the melt within the furnace chamber can be calculated and compensated by feeding Mg-wire (6) through the magnesium infeed valve (19) before restart of the operation.

However, the melt in the outlet channel will be subjected to relatively rapid magnesium losses due to evaporation and oxidation since the outlet is open to the atmosphere. In addition, the melt in the outlet channel cannot be re-charged with magnesium. As a result thereof, the first castings produced after the stop have to be scrapped as they will not have the desired structure.

From SE-328 673 (corresponding to U.S. Pat. No. 3,764, 305) there is known a method to protect the melt in the outlet and inlet openings by flushing with inert gas. However, this method only reduces the magnesium losses to a limited extent and is not sufficient to produce good first CGI castings.

SUMMARY OF THE INVENTION

It is an object of this invention to solve the problems related to fading of nucleation and/or structure modifying agents in the outlet channel of a conditioning furnace and, hence, to improve the yield in the casting of structure modified molten metal.

The present invention is a method for producing pre-treated molten metal castings comprising the steps of:
  i) providing a conditioning furnace, having an inlet channel and an outlet channel, with pre-treated molten metal;
  ii) reducing the height of the molten metal in the outlet channel to a level lower than the level of the molten metal in the conditioning furnace such that the molten metal in a spout of the furnace and in the outlet channel, is at least partly brought back into the furnace body where it can be recharged with a nucleating and/or structure modifying agent;
  iii) adding further nucleating and/or structure modifying agent to the molten metal when necessary;
  iv) mixing the melt in the furnace when necessary; and
  v) after the resulting stoppage, casting the melt with the desired content of structure modifying agent.

According to the present invention, the molten metal in the spout and in the outlet channel can be revitalized after longer stoppages by forcing it back into the conditioning furnace and retreat it with the desired nucleation and/or structure modifying agent.

When practicing the present invention, different types of conditioning furnaces can be used. The furnace may be of the open type when the melt is protected by a slag layer and/or by an inert shielding gas atmosphere. According to one particularly preferred embodiment of the invention, a closed conditioning furnace is used which is also preferably provided with the combined provision of pressurizing and vacuum facilities. The conditioning furnace is also preferably equipped with induction heating and means for measuring or detecting the melt level in the outlet channel.

The inventive method will now be described in more detail with reference to the accompanying drawings.

DETAILED DESCRIPTION OF THE PREFERRED EMBODIMENTS

Figure 1:
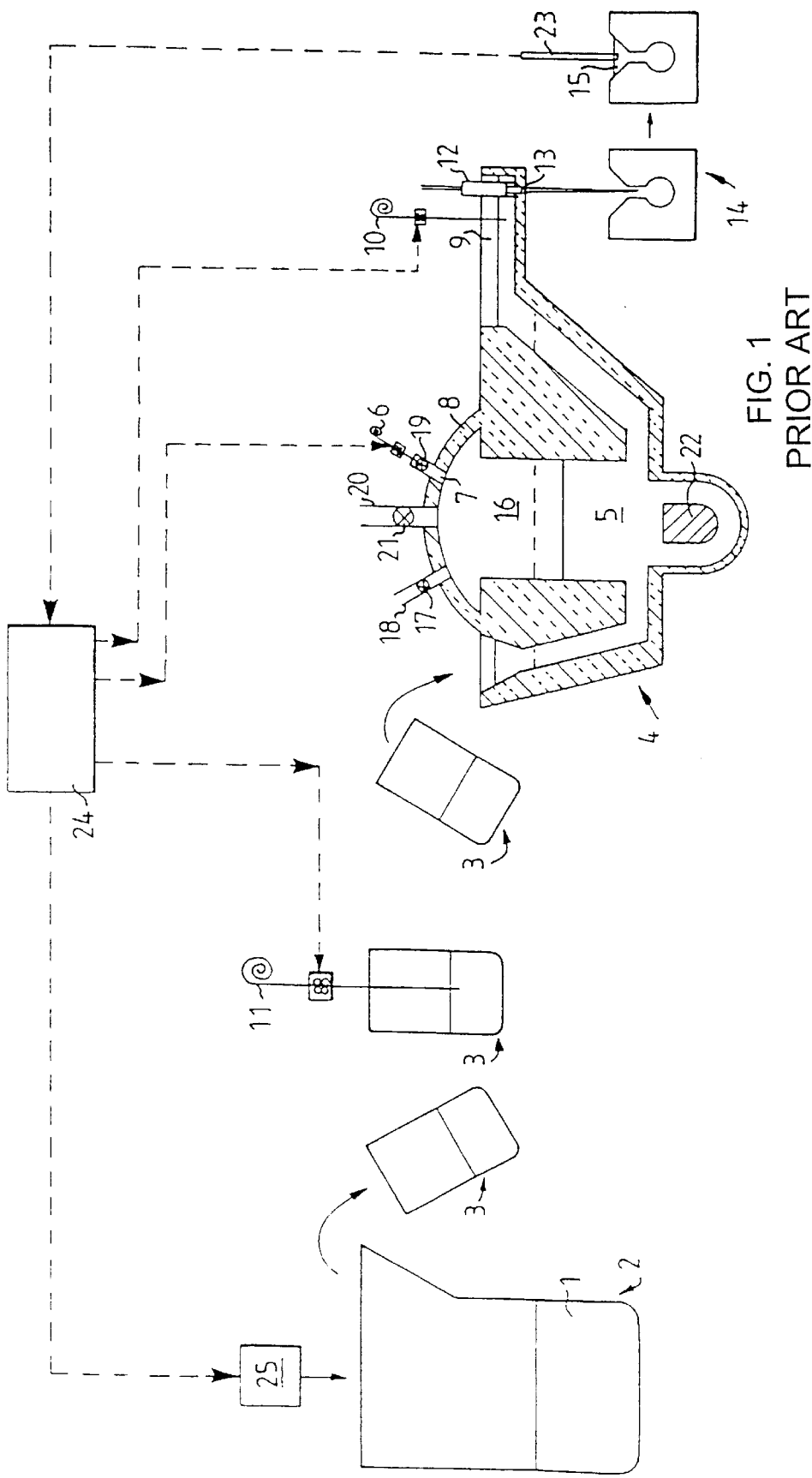
FIG. 1 discloses a schematic view of a prior art method and a furnace assemby suitable for the performance of the present invention.

In the case of the embodiment of the prior art method illustrated in FIG. 1, there is first prepared an iron melt 1 in a furnace 2. In this case, the melt is produced from iron scrap. The carbon equivalent of the melt is adjusted in the furnace 2 by adding carbon and steel to the melt, as indicated at 25. The melt is then transferred to a ladle 3, in which the melt is subjected to a basic treatment process, consisting in the addition of magnesium 11 in pure form, consisting in the addition of magnesium 11 in some suitable form.

Subsequent to this basic treatment, slag is removed from the melt and the melt is transported to and introduced into a closed conditioning furnace 4, in which a pressurized inert gas atmosphere is maintained and which is of the so-called PRESSPOUR type sold by the company ABB (e.g. of product number LFR 5 CTO, LFR 10 CTO or LFR 20 CTO). Melt is tapped from the furnace in a controlled fashion, either by controlling the overpressure in the furnace space 16—with the aid of a slide valve 17 on the gas delivery line 18—or with the aid of a stopper rod 12 which fits into the tapping hole 13 in the spout 9, or by a combination of these control methods.

The melt 5 is heated by means of an induction heating unit 22 and is therewith also remixed to some extent. The batch of melt introduced into the conditioning furnace 4 is mixed with the melt 5 already present therein. About 75% of the maximum capacity of the furnace is utilized when the process is continuous. Further magnesium is supplied to the furnace 4 when necessary.

The magnesium is supplied in the form of optionally steel-sheathed magnesium wire or rod 6, which is fed into the furnace 4 through a closable opening 7 provided in the furnace casing 8. As with other additions, the magnesium addition is also governed by the result of the thermal analysis of the cast compacted graphite iron.

The opening 7 is provided with a slide valve 19. The arrangement also includes a chimney 20 through which MgO and Mg vapour is ventilated and which is provided with a slide valve 21 mounted in the casing 8. The valve 17 is open for continuous gas delivery during operation, whereas the valves 19 and 21 are closed.

When needing to introduce the Mg rod 6 into the furnace, the furnace pressure is first lowered by closing the valve 17 (thereby interrupting the supply of gas). The level of melt in the spout 9 will then fall to the level shown in broken lines. This operation takes about 10 seconds to effect. The valve 21 in the chimney 20 and the magnesium infeed valve 19 are then opened, which takes about 5 seconds. Magnesium rod 6 is fed for about 30 seconds into the furnace. The valves 19 and 21 are then closed, which takes a further 5 seconds. Finally, the valve 17 is opened and the pressure increased to its normal operational level, which takes about 20 seconds. The time taken to feed magnesium rod 6 into the conditioning furnace is thus about 70 seconds in total.

Inoculating agent 10 is delivered to the spout 9 of the furnace in accordance with the aforesaid regulating principle immediately prior to tapping-off the melt. Tapping of melt from the furnace 4 is controlled with the aid of the stopper rod 12.

The method sequence is terminated by taking a sample 14 for thermal analysis with the aid of a sampling device 23, not described in detail here. In the illustrated case, the sample is taken in the gate or sprue system 15 of a casting mould 14. In order to ensure that the analysis result will represent the contents of the furnace, 4–5 casting moulds are allowed to pass after each replenishment of the conditioning furnace, before taking a sample. The sample is analyzed with the aid of a computer 24, not described in detail here; the broken line arrows indicate the flow of information to and from the computer 24.

The additions of structure modifying agents to the system are regulated suitably in accordance with the principles described in the Swedish patent application 9304347-9.

Figure 2A:
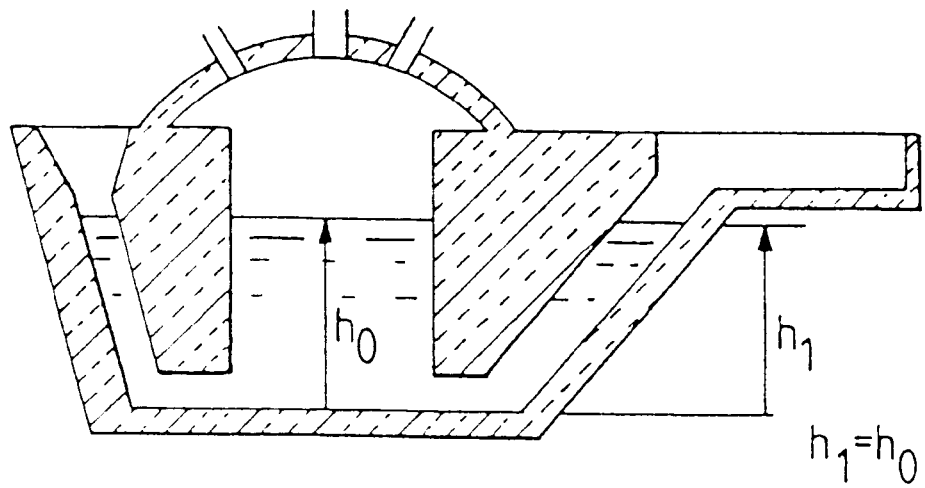
FIG. 2B is a drawing of a conditioning furnace showing the molten metal levels during stoppages in the present invention as compared to that of the prior art shown in FIG. 2A.
Figure 2B:
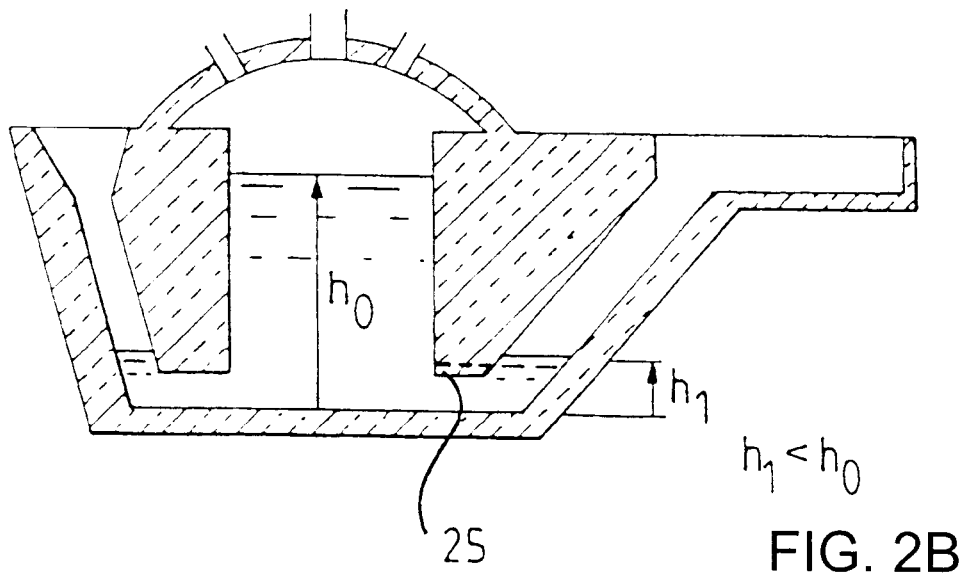

FIG. 2 discloses the molten metal levels during longer stoppages in the casting operation wherein $h_0$ denotes the molten metal level within the conditioning furnace and $h_1$ the molten metal level in the outlet channel. In the prior art method (FIG. 2a), $h_1 = h_0$ is obtained by removing the overpressure from the furnace chamber and the melt in the outlet channel cannot be revitalized before start up of operation. According to the present invention, $h_1$ is smaller than $h_0$ as shown in FIG. 2b, i.e. the melt in the spout and in the outlet channel is brought back into the conditioning furnace. There, it can be revitalized by recharging with the desired content of nucleating and/or structure modifying agent, e.g. magnesium, before restarting the casting operation.

If the furnace is a closed furnace provided with the combined provision of vacuum and pressurizing means as shown schematically in FIG. 2b, vacuum can be applied to the furnace chamber for sucking the melt from the outlet channel into the furnace. By positioning the inside opening of the outlet channel higher than that of the inlet channel (as shown by phantom line 25 in FIG. 2B), the latter will also act as a fluid lock at a low metal level ($h_1$) in the outlet channel. The melt that is sucked back from the outlet channel may also be used in mixing of incoming heats with bulk metal.

The level of the molten metal in the outlet channel can also be lowered by applying an overpressure above the molten metal in the outlet channel or by applying electromagnetic forces to the molten metal in the outlet channel. In one embodiment of the present invention, the revitalizing step is performed only at an end of the stoppage and, in particular, during the last 30 seconds before start of casting. Furthermore, the revitalizing step can be performed repeatedly prior to resuming casting and in one embodiment can be repeated 2 to 5 times.

The method is well suited for the production of magnesium treated cast iron, in particular compacted graphite iron (CGI) having lower contents of magnesium as a structure modifying than ductile iron. If the stoppage is planned to last long, it would be sufficient to apply the method at the end of the stoppage for revitalizing the melt shortly before start-up of the operation.

For controlling the height of the molten metal level in the outlet channel, most of the commonly used metal level indication techniques can be applied. In addition, the vacuum pressure can not only be used for regulationg the melt level but also for detecting the lowest allowable melt level in the outlet channel,i.e. when h1 equals the height of the outlet opening from the furnace such that air will be sucked into the furnace.

What is claimed is:

1. A method for producing molten metal castings of cast iron after a stoppage in production, comprising the steps of:
   i) providing a conditioning furnace, having an inlet channel and an outlet channel, with pre-treated molten iron; and
   ii) after the stoppage in the production of castings, forcing molten iron from the outlet channel into the furnace by reducing a height of the molten iron in the outlet channel to a level lower than a height of the molten iron in the furnace, revitalizing said molten iron with at least one of a nucleation agent and a structure modifying agent to a desired content by adding said agent into the furnace before restartng the production of castings;
   iii) casting the revitalized molten iron.

2. A method according to claim 1 wherein the conditioning furnace is essentially closed.

3. A method according to claim 1 wherein the structure modifying agent is magnesium.

4. A method according to claim 1 wherein vacuum is applied to the conditioning furnace for lowering the level of molten iron in the outlet channel in step ii).

5. A method according to claim 1 wherein overpressure is applied above the molten iron in the outlet channel for lowering the level of molten metal in the outlet channel in step ii).

6. A method according to claim 1 wherein electromagnetic forces are applied to the molten iron in the outlet channel for lowering the level of molten iron in the outlet channel in step ii).

7. A method according to claim 1 wherein the cast iron is one of a ductile iron and a compacted graphite iron.

8. A method according to claim 1 wherein at the inside of the conditioning furnace an opening to the outlet channel is positioned higher than an opening of the inlet channel to act as a fluid lock at a low metal level when a vacuum is used to force molten iron from the outlet channel into the furnace.

9. A method according to claim 1 wherein step ii) is performed only during the last 30 seconds before restarting casting.

10. A method according to claim 9 wherein step ii) is performed repeatedly from 2 to 5 times before restart of the production of castings.

11. A method according to claim 10 wherein the revitalizing in step ii) is performed solely by re-mixing the molten iron in the outlet with the molten iron in the furnace.

* * * * *